(12) United States Patent
Nagao

(10) Patent No.: US 11,354,379 B2
(45) Date of Patent: Jun. 7, 2022

(54) DISPLAY CONTROL METHOD AND DISPLAY CONTROL APPARATUS

(71) Applicant: FUJITSU LIMITED, Kawasaki (JP)

(72) Inventor: Yuuki Nagao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 70 days.

(21) Appl. No.: 16/699,795

(22) Filed: Dec. 2, 2019

(65) Prior Publication Data

US 2020/0175082 A1    Jun. 4, 2020

(30) Foreign Application Priority Data

Dec. 3, 2018  (JP) .............................. JP2018-226776

(51) Int. Cl.
| | | |
|---|---|---|
| *G06F 16/958* | (2019.01) | |
| *G06F 3/0485* | (2022.01) | |
| *G06F 16/955* | (2019.01) | |
| *G06F 16/901* | (2019.01) | |
| *G06F 3/04886* | (2022.01) | |

(52) U.S. Cl.
CPC .......... *G06F 16/958* (2019.01); *G06F 3/0485* (2013.01); *G06F 3/04886* (2013.01); *G06F 16/9027* (2019.01); *G06F 16/955* (2019.01)

(58) Field of Classification Search
None
See application file for complete search history.

(56) References Cited

U.S. PATENT DOCUMENTS

| | | | |
|---|---|---|---|
| 2009/0070413 A1* | 3/2009 | Priyadarshan ...... | G06F 16/9577 709/203 |
| 2011/0258532 A1* | 10/2011 | Ceze ................... | G06F 16/9574 715/234 |
| 2012/0151329 A1 | 6/2012 | Cordasco | |
| 2014/0173414 A1* | 6/2014 | Chan ..................... | G06F 40/143 715/234 |
| 2017/0371842 A1* | 12/2017 | Brunn ................... | G06F 40/106 |

FOREIGN PATENT DOCUMENTS

| | | |
|---|---|---|
| JP | 2010-157083 A | 7/2010 |
| JP | 2014-507036 A | 3/2014 |
| JP | 2014-519073 A | 8/2014 |

* cited by examiner

*Primary Examiner* — Stella Higgs
(74) *Attorney, Agent, or Firm* — Fujitsu Patent Center

(57) ABSTRACT

A computer-implemented display control method includes, in response to receiving an instruction for displaying a first web page, determining whether difference between a display configuration of the first web page and a display configuration of a second web page satisfies a specific condition, the first web page being different from the second web page, and displaying, on a display, a region of the first web page corresponding to positional information indicating a region of the second web page without a scroll operation of a user after the receiving of the instruction when it is determined that the difference satisfies the condition.

20 Claims, 13 Drawing Sheets

FIG. 7

```
<html>
<head>
<meta name="keywords" content="keyword1, keyword2" >
<script src="script.js"></script>
<link rel="stylesheet" type="text/css" href="style.css">
</head>
<body>
<h1>TITLE</h1>
<img scr="pic1.png"><img scr="pic2.png"><img scr="pic3.png"><br />
<div id="ad1">ADVERTISEMENT 1</div>
<div id="ad2">ADVERTISEMENT 2</div>
<div id="content">
    TEXT. ........................
</div>
<div id="footer">ADVERTISEMENT 3</div>
</body>
</html>
```

FIG. 8

| URL | POSITION INFORMATION | DOM INFORMATION | STRUCTURE BETWEEN ELEMENTS |
|---|---|---|---|
| http://www.blog.jp/user-id/entry-20180710.html | (10, 360, 200, 400) | <html><body>... | /html/body/div[@id='content'] |

20

DISPLAY CONTROL METHOD AND DISPLAY CONTROL APPARATUS

CROSS-REFERENCE TO RELATED APPLICATION

This application is based upon and claims the benefit of priority of the prior Japanese Patent Application No. 2018-226776, filed on Dec. 3, 2018, the entire contents of which are incorporated herein by reference.

FIELD

The technique disclosed herein is related to a display control technique.

BACKGROUND

Due to popularization and high functionalization of information terminals such as smartphones and the like, browsers for browsing web pages are installed in various information terminals. On the other hand, screen sizes of the information terminals are smaller than those of personal computers (PC) or the like. For this reason, when content analogous to content which the PCs display is displayed in the browsers installed in the smartphones or the like, display configurations thereof tend to be vertically longer.

The technique of related art for displaying content in a browser has been proposed. For example, a method for accelerating rendering of a web page by a browser has been proposed. The method stores a document object model (DOM) tree structure and calculation of a rendered page and compares portions of DOM trees of a page to be rendered and the rendered page to determine whether the portions of the DOM tree structures match. When the DOM tree of the web page to be rendered matches the DOM tree stored in a memory, rendering computation associated with the matching DOM tree is reused.

The technique for providing on-page operations and real-time replacement of content is provided. In this technique, a client application intercepts a request to render target content and the target content is intercepted when the target content is supplied from a content source. Based on a predetermined criterion, the target content is replaced with replacement content.

A server based computing system capable of improving an operation response by reducing an amount of communication data associated with a scroll operation of a display screen of a client device has been proposed. In this system, a web page is acquired by the server in response to a web page acquisition request from the client, and drawing data corresponding to a display size of the client is generated. The drawing data with an entire size of the web page and a display position of the drawing data on the same page is transmitted to the client as a response. The client displays the drawing data of the web page, and displays a local scroll bar indicating a display range of the drawing data with respect to the entire size of the page. The display range indicated by the bar is changed in response to an operation of the scroll bar, and the operation is finished. A display position change request describing the display position after the range change is transmitted to the server, and the changed drawing data is generated by the server, and the client display is updated.

Related art is disclosed in, for example, Japanese National Publication of International Patent Application Nos. 2014-519073 and 2014-507036, and Japanese Laid-open Patent Publication No. 2010-157083.

SUMMARY

According to an aspect of the embodiments, a computer-implemented display control method includes, in response to receiving an instruction for displaying a first web page, determining whether difference between a display configuration of the first web page and a display configuration of a second web page satisfies a specific condition, the first web page being different from the second web page, and displaying, on a display, a region of the first web page corresponding to positional information indicating a region of the second web page without a scroll operation of a user after the receiving of the instruction when it is determined that the difference satisfies the condition.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an example of an HTML source;

FIG. 8 is a diagram illustrating an example of a registration information database;

DESCRIPTION OF EMBODIMENTS

As described above, on an information terminal having a small screen size, when a display configuration of a web page becomes vertically long, there are some cases where many scroll operations or the like are required before a portion desired by a user, such as the text of content, is displayed. In the related art, it is difficult to reduce the scroll operations or the like required for browsing a web page to quickly display a portion desired by a user, so that convenience for the user may not be enhanced.

Before explaining details of the embodiment, a case will be described where many scroll operations are performed until the portion desired by the user is displayed when a web page is displayed.

As described above, on an information terminal such as a smartphone having a smaller screen size than that of a PC, when content analogous to content which the PC displays is displayed, a display configuration thereof tends to be vertically longer. In this embodiment, the display configuration includes a structure of a web page, a relationship between elements included in the web page, a layout of the elements included in the web page, and the like. The elements are text data, images or the like displayed on a web page.

Figure 1:
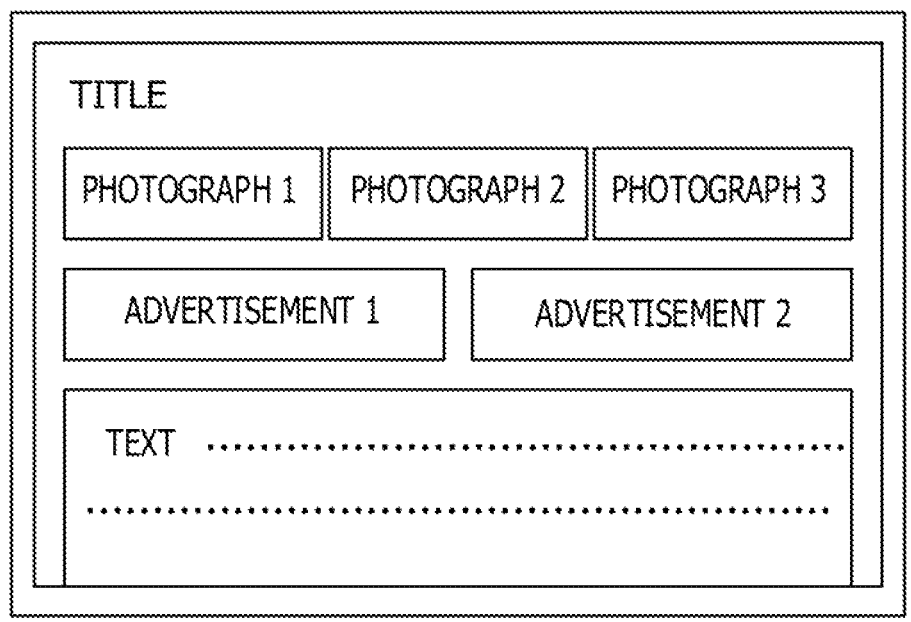
FIG. 1 is a diagram illustrating a display example of a web page on a personal computer.
Figure 2:
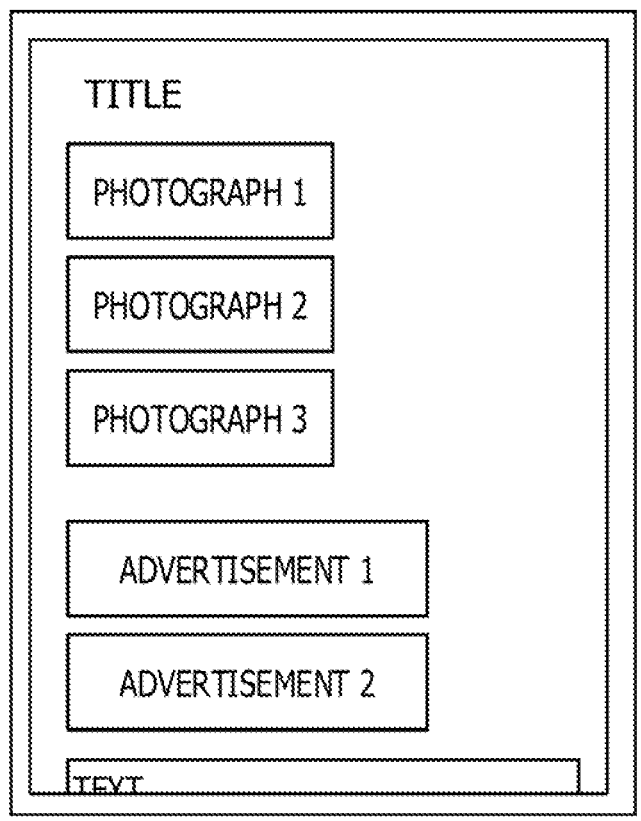
FIG. 2 is a diagram illustrating a display example of a web page on a smartphone.

For example, it is assumed that a web page displayed as illustrated in FIG. 1 on a display of a PC, is displayed as illustrated in FIG. 2 on a smartphone by changing the display configuration. In this case, when the user desires to read the text arranged under an advertisement 2, it is required to scroll until the text portion is displayed. This embodiment is an example in which such scroll operations are reduced and a portion desired by a user is automatically displayed.

Figure 3:
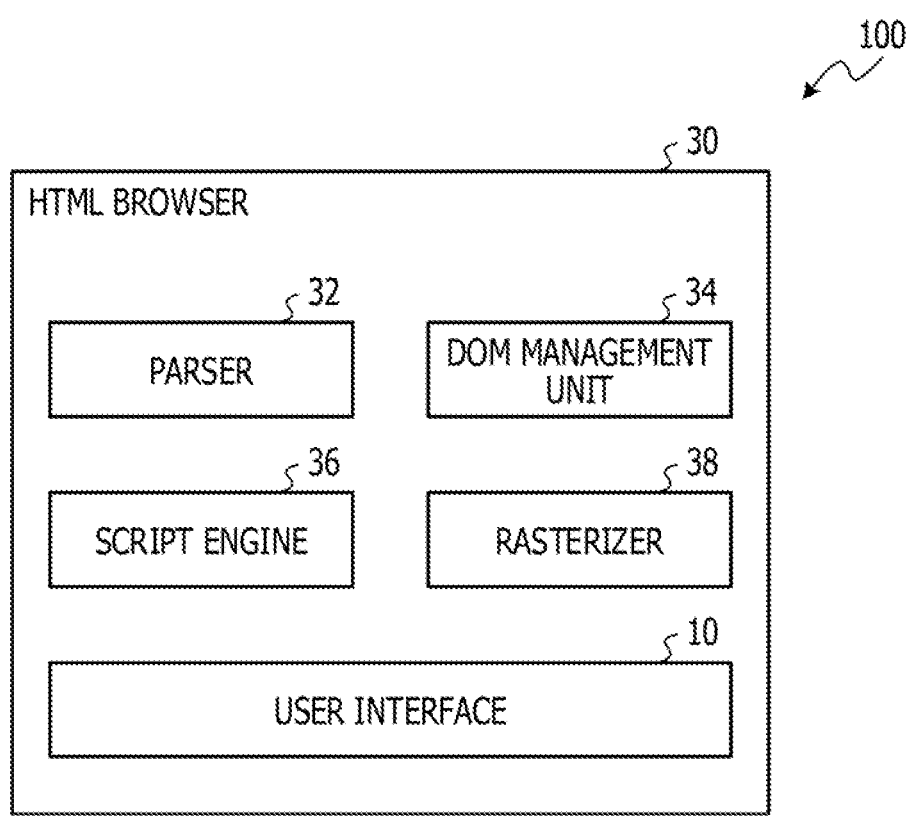
FIG. 3 is a block diagram illustrating a schematic configuration of an HTML browser installed in an information processing apparatus.

As illustrated in FIG. 3, an information processing apparatus 100 according to the present embodiment is installed with a hyper text markup language (HTML) browser 30. The HTML browser 30 includes a parser 32, a DOM management unit 34, a script engine 36, a rasterizer 38, and a user interface 10 as functional units. The user interface 10 is an example of a display control apparatus according to the disclosed technique.

Various types of resources such as an HTML source, an image forming an HTML source, and a source file written in JavaScript (registered trademark), are acquired from a web server via a network such as the Internet, or are stored in a predetermined storage area in advance. Hereinafter, various types of resources are also referred to as "HTML sources".

The HTML source is converted into document object model (DOM) information which is internal information by the parser 32, and is held in the DOM management unit 34. The DOM management unit 34 visualizes the DOM information held by using the rasterizer 38, and displays the DOM information on a display unit. The script engine 36 interprets a script written in JavaScript (registered trademark) and executes the script.

Figure 4:
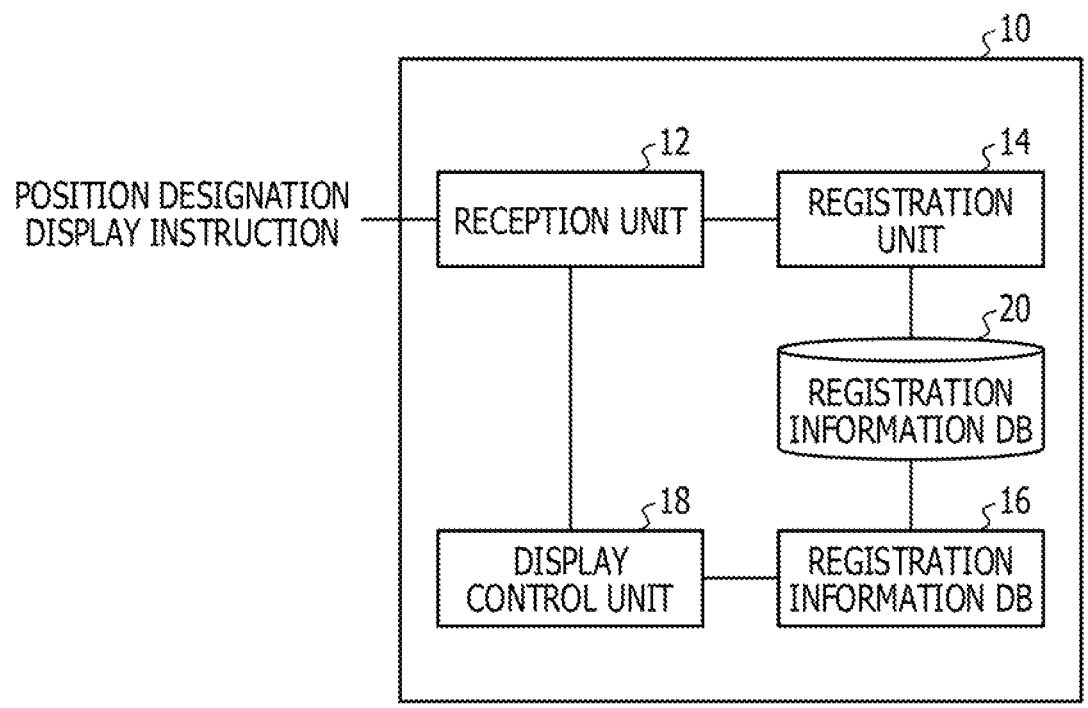
FIG. 4 is a functional block diagram of a user interface.

As illustrated in FIG. 4, the user interface 10 includes a reception unit 12, a registration unit 14, a determination unit 16, a display control unit 18, and a registration information database (DB) 20 as functional units related to the disclosed technique.

The reception unit 12 receives a Uniform Resource Locator (URL) of a web page to be displayed as a display instruction of the web page. Based on the received URL, the reception unit 12 acquires a HTML source from a web server, and transfers the HTML source to the parser 32, or stores the HTML source in a predetermined storage area.

The reception unit 12 receives designation of position information indicating a portion desired by a user in the web page displayed on the display unit.

Figure 5:
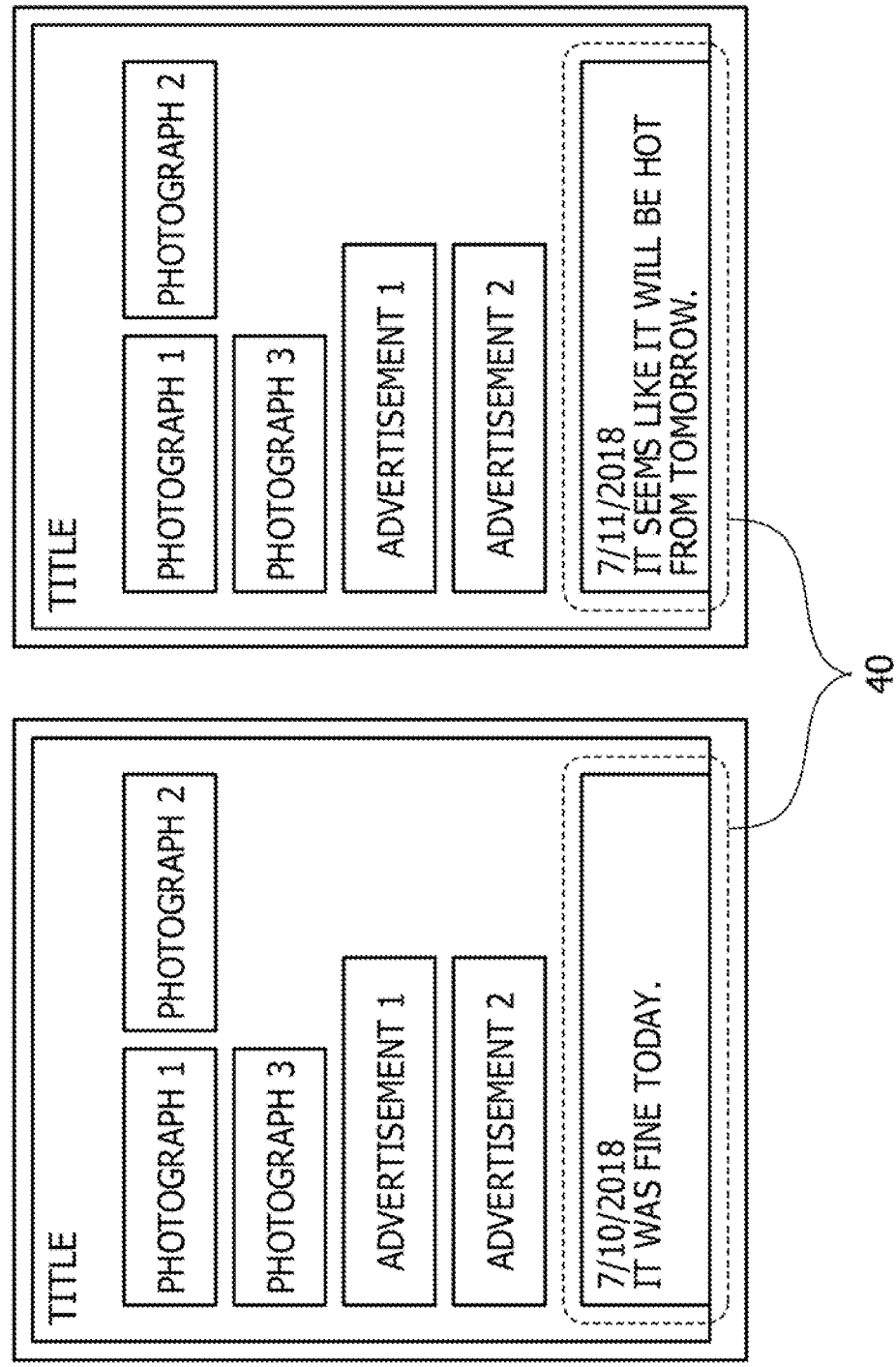
FIG. 5 is a diagram for explaining web pages having analogous display configurations.

With the current spread of content management systems (CMS), a web page template is prepared in advance by a CMS, and the web page is completed only by inputting a specific portion such as the text. As such a web page, as illustrated in FIG. 5, there is a web page such as a so-called blog in which a portion other than text 40 is a template and only the text 40 is changed. In the example illustrated in FIG. 5, a left web page and a right web page are different web pages to which different URLs are assigned, but display configurations thereof are substantially identical to each other.

In such a web page, when a distance from a head of a web page to a target portion such as the text 40 is long, many scroll operations are required every time when each web page is browsed. In a case where such a web page is browsed by a user, when a portion of the text 40 is displayed at a predetermined position such as a head or a center of a browser after the web page is displayed, convenience of the user is improved.

Therefore, when displaying a web page analogous to the web page currently being displayed, the reception unit 12 receives an element to be displayed at the predetermined position of the browser as position information indicating a portion desired by the user.

Figure 6:
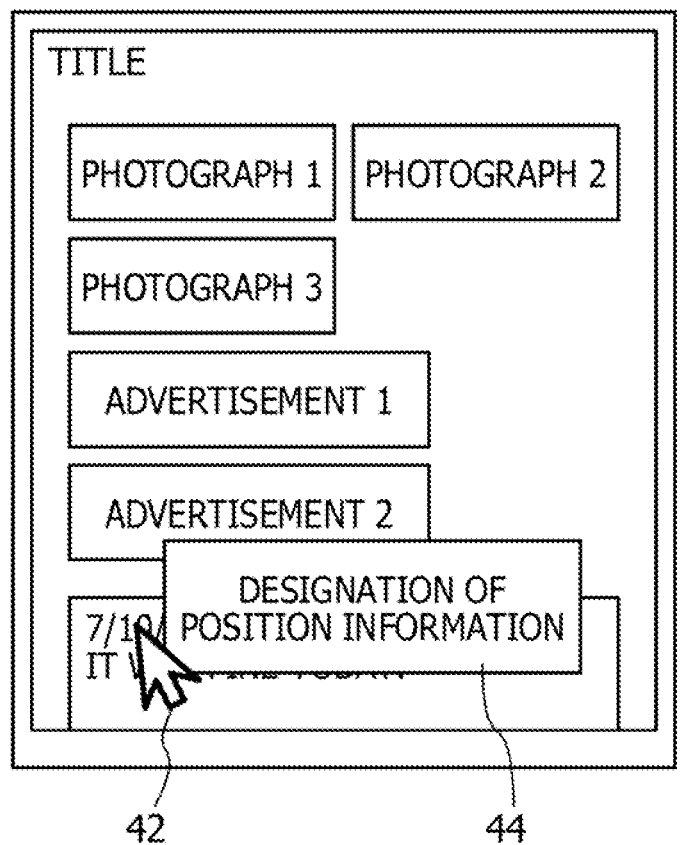
FIG. 6 is a diagram for explaining designation of position information.

For example, as illustrated in FIG. 6, the reception unit 12 displays a pop-up menu 44 for designating the position information when a right button is clicked in a state where a cursor 42 is pointed to the element corresponding to the portion desired by the user. When the pop-up menu 44 is selected, rectangular information of the element in which the cursor 42 is located may be received as the position information.

The rectangular information is information including coordinate values (x, y) of a position (for example, an upper left corner) serving as a reference of a rectangular region representing a range occupied by the element, a size w of the rectangular region in a lateral direction, and a size h of the rectangular region in a longitudinal direction. The rectangular information is obtained from DOM information when display of the web page is completed. In the following, the rectangular information which is the position information is represented by (x, y, w, h).

A method for receiving the position information is not limited to the above example, and the position information may be designated in a state in which designation of the position information is selected from a separately displayed menu.

The reception unit 12 transfers the received position information to the registration unit 14. When the position information is transferred from the reception unit 12, the registration unit 14 registers the transferred position information in the registration information DB 20 in association with identification information of the web page currently being displayed.

Specifically, the registration unit 14 acquires a URL and DOM information of the web page currently being displayed. The registration unit 14 identifies a tree structure of the web page from the DOM information and generates information indicating a structure between elements from the root of the tree structure to the element indicated by the position information transferred from the reception unit 12.

For example, the registration unit 14 may use XPath as the information indicating the structure between elements. A case where Xpath is used will be described with a more specific example. It is assumed that a HTML source of the web page illustrated in FIG. 6 is illustrated in FIG. 7, and that the element designated as the position information is <div id="content"> in the HTML source. In this case, the element designated as the position information may be represented by Xpath, which is "/html/body/div[@id='content']".

The information indicating the structure between elements to be generated here is not based on a HTML source immediately after being downloaded from the web server, but is required to be a HTML source after being operated by JavaScript (registered trademark), Cascading Style Sheets (CSS), or the like. Therefore, the information indicating the structure between the elements is generated from the DOM information stored in the DOM management unit 34.

The registration unit 14 registers the position information transferred from the reception unit 12, the acquired URL, the DOM information, and the generated information indicating the structure between the elements, in the registration information DB 20, for example, as illustrated in FIG. 8.

The determination unit 16 determines whether or not the display configuration of the web page currently being displayed is analogous to the display configuration of the specific web page in which the URL is registered in the registration information DB 20.

Specifically, the determination unit 16 determines whether or not each URL registered in the registration information DB 20 is analogous to the URL of the web page currently being displayed. As described above, in the case of web pages created by using a CMS, there are many cases where URLs are analogous to each other, so that it is possible to infer that display configurations of the web pages are analogous to each other because the URLs are analogous to each other.

For example, the determination unit 16 may compare character strings of the URLs character by character from the heads to determine whether or not the URLs are analogous by determining whether or not domains match each other and whether or not the one or more character strings divided by "/" among the character strings after the domains match each other.

Assuming that the URLs of the two web pages illustrated in FIG. 5 are the respective following URLs, the determination unit 16 may determine that the two URLs are substantially identical to each other and are analogous to each other.

A URL of the web page at the left side in FIG. 5:
http://www.blog.jp/user-id/entry-20180710.html
A URL of the web page at the right side in FIG. 5:
http://www.blog.jp/user-id/entry-20180711.html Only by the similarity of the URLs, it may be impossible to accurately determine the similarity of the display configurations. Therefore, the determination unit 16 compares the display configuration related to the HTML source acquired from the web server in accordance with the display instruction with the display configuration of the specific web page registered in the registration information DB 20, and determines whether or not the display configurations are analogous. In the present embodiment, as the display configuration related to the HTML source, the rectangular information of the element designated as the position information and the structure between the elements up to the designated element are used.

For example, it is assumed that the web page illustrated in FIG. 6 is written as the HTML source as illustrated in FIG. 7. In the HTML source illustrated in FIG. 7, it is assumed that a portion surrounded by a broken line is a portion that changes in a different web page, and that a portion other than the portion surrounded by a broken line is a portion to be generated by a CMS. Of the portion generated by the CMS, the contents contained in the rectangular region such as an image designated as src of <img> and a character string ("Advertisement 1") surrounded by <divid="ad1"> may change. Therefore, these contents are not comparison targets for the similarity. This is because the display configurations of the web pages generated by the CMS are substantially fixed, and therefore, as long as attention is paid only to the display configurations, it is possible to fully determine whether or not the web pages are analogous.

Specifically, as for the determination of the similarity by using the rectangular information, the determination unit 16 acquires the rectangular information registered, in the registration information DB 20, as the "position information" corresponding to the URL of the specific web page determined to be analogous to the URL of the web page currently being displayed. The determination unit 16 inquires of the DOM management unit 34 whether or not an element indicating rectangular information identical or analogous to the acquired rectangular information is included in the web page currently being displayed. The fact that the pieces of rectangular information are analogous may mean a case where a difference between the respective values included in the pieces of rectangular information is within a predetermined range.

Figure 9:
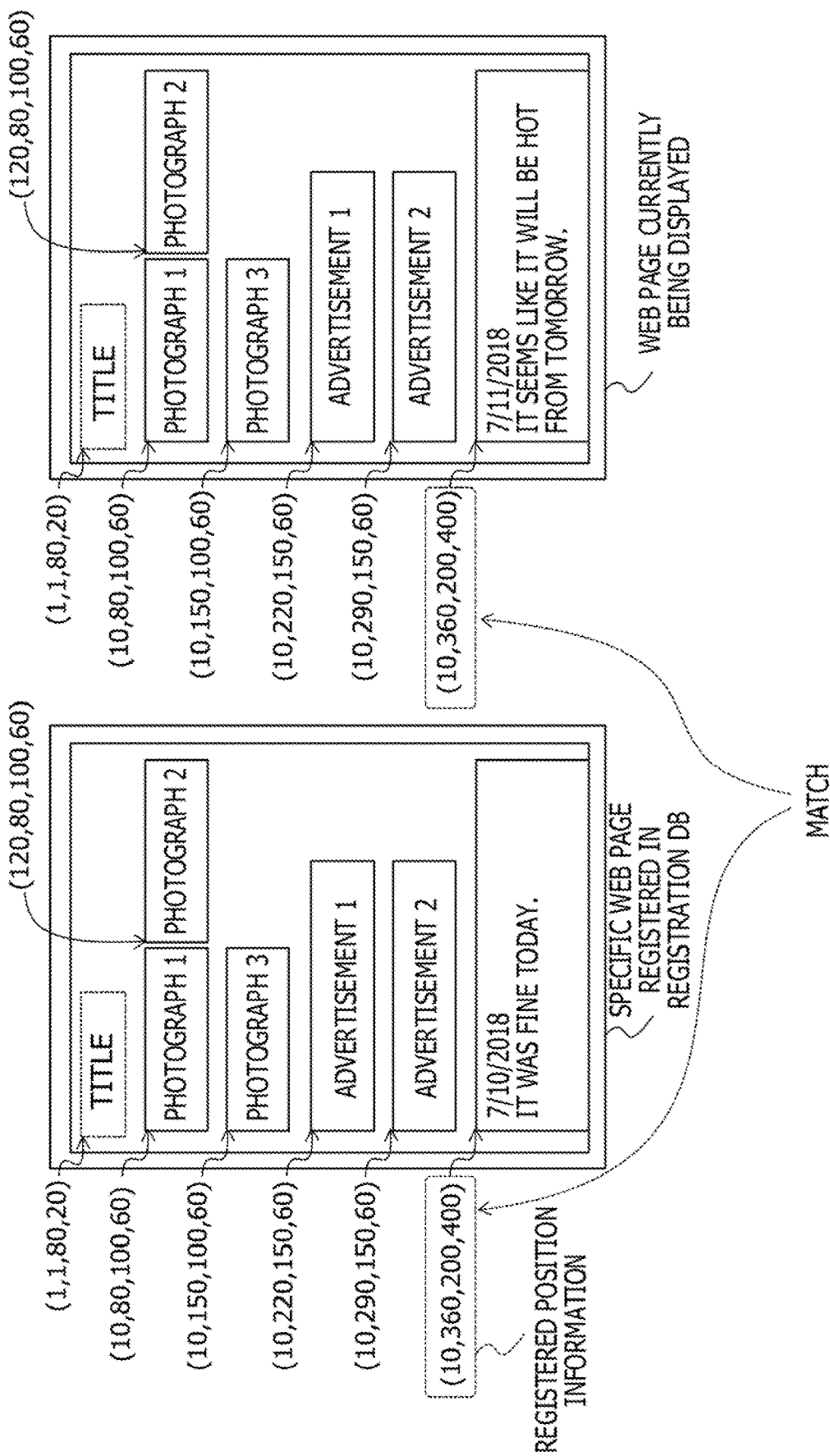
FIG. 9 is a diagram for explaining a comparison of pieces of rectangular information.

As Illustrated in FIG. 9, when rectangular information (10, 360, 200, 400) is registered as position information for a specific web page, the DOM management unit 34 determines whether or not the DOM information of the web page currently being displayed includes an element of rectangular information identical or analogous to the rectangular information (10, 360, 200, 400). In the example illustrated in FIG. 9, since the element of the identical rectangular information (10, 360, 200, 400) is included in the web page currently being displayed, the DOM management unit 34 returns a response indicating that the corresponding element is included, to the determination unit 16.

When there is a response indicating that the corresponding element is not included, from the DOM management unit 34, the determination unit 16 determines that the display configurations of the web page currently being displayed and the specific web page that is registered in the registration information DB 20 are not analogous to each other.

Even when the element of the rectangular information identical or analogous to the rectangular information indicated by the position information of the specific web page is included in the web page currently being displayed, the rectangular information may change depending on factors such as change of a size of a character to be displayed and a difference between window sizes of the browsers. Therefore, when there is a response indicating that the corresponding element is included from the DOM management unit 34, the determination unit 16 acquires the "structure between the elements" of the specific web page from the registration information DB 20. The determination unit 16 inquires of the DOM management unit 34 whether or not the structure between the elements that matches the structure between the acquired elements is included in the web page currently being displayed.

When there is a response indicating that the corresponding structure between the elements is not included in the web page currently being displayed from the DOM management unit 34, the determination unit 16 determines that the display configurations of the web page currently being displayed and the specific web page registered in the registration information DB 20 are not analogous. On the other hand, when there is a response indicating that the corresponding structure between the elements is included in the web page currently being displayed from the DOM management unit 34, the determination unit 16 determines that the display configurations of the web page currently being displayed and the specific web page registered in the registration information DB 20 are analogous. The determination unit 16 transfers the rectangular information of the element included in the web page currently being displayed, which is determined to be identical or analogous to the rectangular information as the position information acquired from the registration information DB 20, to the display control unit 18.

The display control unit 18 controls the display such that the web page currently being displayed is scrolled in order to arrange the element indicated by the rectangular information transferred from the determination unit 16, of the web page currently being displayed, at predetermined positions such as the head and center of the browser.

Figure 10:
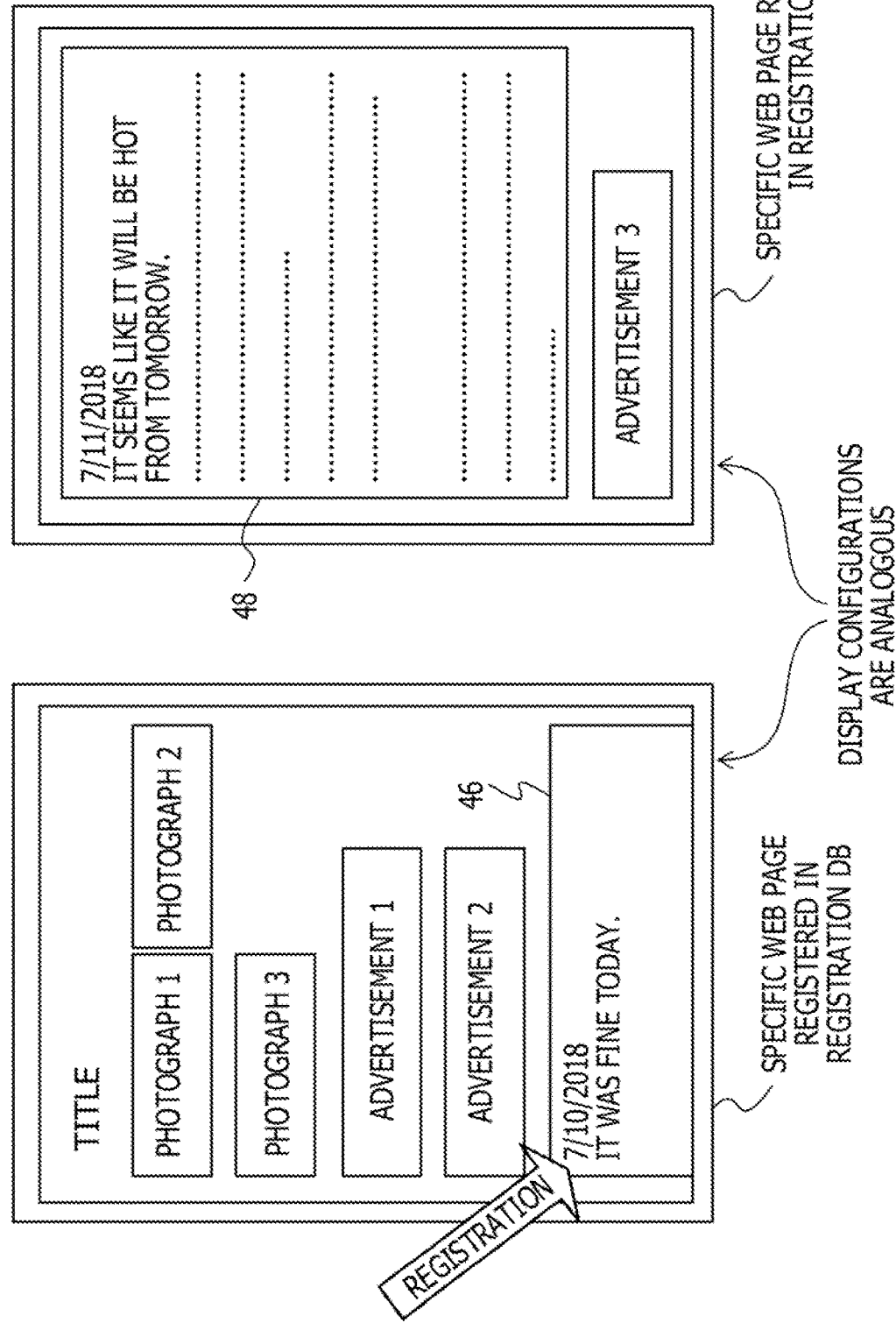
FIG. 10 is a diagram for explaining display of a web page having an analogous display configuration to a specific web page.

It is assumed that the display configurations of the specific web page in which the position information is registered in the registration information DB 20 and the web page currently being displayed are analogous. In this case, as illustrated in FIG. 10, an element 48 of the web page currently being displayed corresponding to an element 46 indicated by the registered position information is automatically scrolled so as to be arranged at a predetermined position (the head in the example illustrated in FIG. 10) of the browser.

Figure 11:
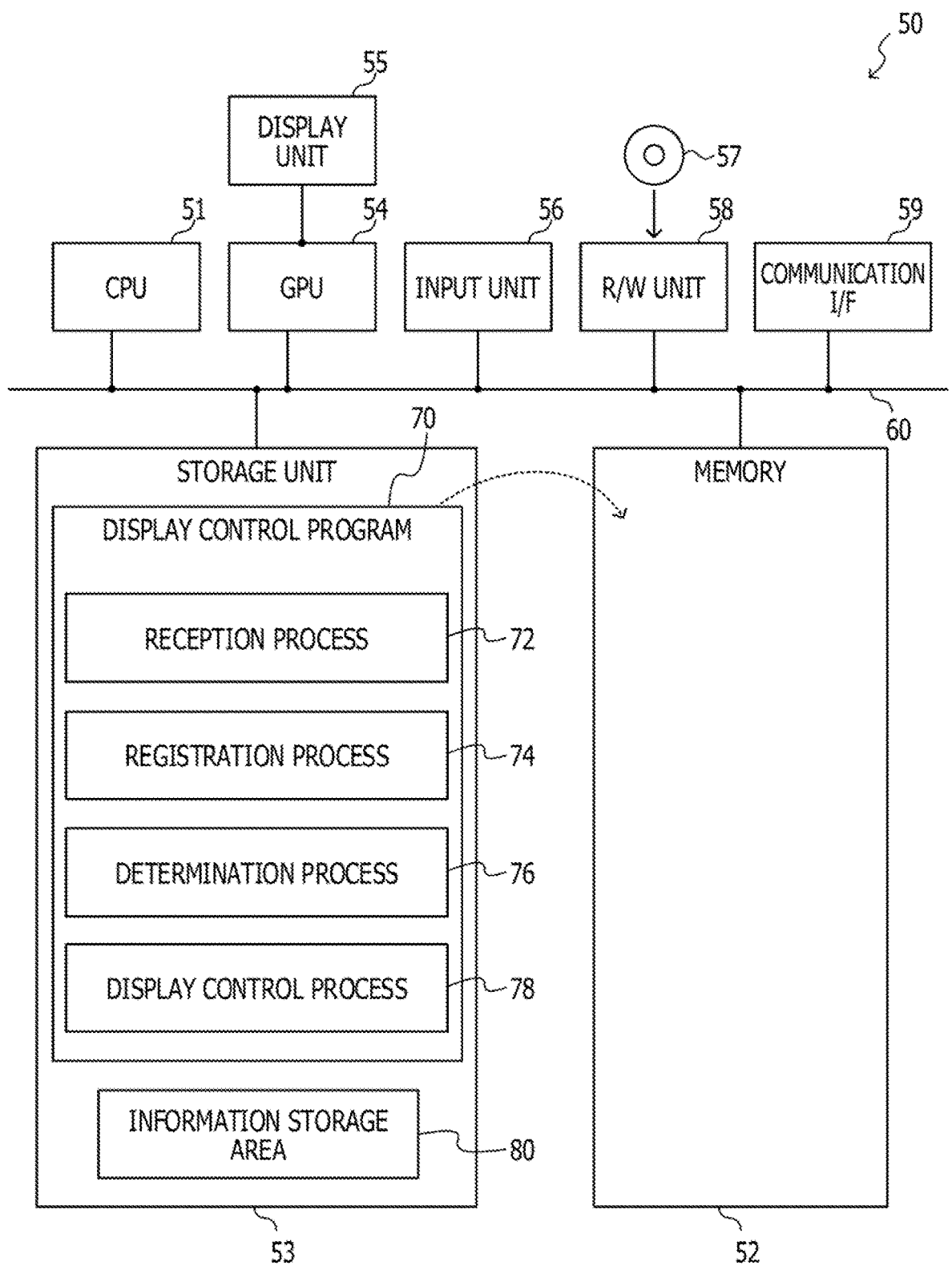
FIG. 11 is a block diagram illustrating a schematic configuration of a computer functioning as an information processing apparatus.

The information processing apparatus 100 may be implemented by a computer 50 illustrated in FIG. 11, for example. The computer 50 includes a central processing unit (CPU) 51, a memory 52 serving as a temporary storage area, and a storage unit 53 that is nonvolatile. The computer 50 includes a graphics processing unit (GPU) 54, a display unit 55 on which an image is displayed under control of the GPU 54, and an input unit 56 such as a mouse, a keyboard, and a touch panel. The computer 50 also includes a read/write (R/W) unit 58 that reads data from a storage medium 57 and writes data to the storage medium 57, and a communication interface (I/F) 59 that is coupled to a network such as the Internet. The CPU 51, the memory 52, the storage unit 53, the GPU 54, the input unit 56, the R/W unit 58, and the communication I/F 59 are coupled to each other via a bus 60.

The storage unit 53 may be implemented by a hard disk drive (HDD), a solid state drive (SSD), a flash memory, or the like. In the storage unit 53 as a storage medium, a display control program 70 for causing the computer 50 to function as the user interface 10 of the HTML browser 30 installed in an information processing apparatus 100 is stored. The display control program 70 includes a plurality of instructions for executing a reception process 72, a registration process 74, a determination process 76, and a display control process 78. The storage unit 53 also includes an information storage area 80 in which information configuring the registration information DB 20 is stored. Illustration and description of programs and processes corresponding to other functional units of the HTML browser 30 will be omitted in FIG. 11.

The CPU 51 reads the display control program 70 from the storage unit 53, loads the display control program 70 to the memory 52, and sequentially executes the processes included in the display control program 70. The CPU 51 executes the reception process 72 to operate as the reception unit 12 illustrated in FIG. 4. The CPU 51 executes the registration process 74 to operate as the registration unit 14 illustrated in FIG. 4. The CPU 51 executes the determination process 76 to operate as the determination unit 16 illustrated in FIG. 4. The CPU 51 executes the display control process 78 to operate as the display control unit 18 illustrated in FIG. 4. The CPU 51 reads out information from the information storage area 80 and develops the registration information DB 20 into the memory 52. As a result, the computer 50 executing the display control program 70 functions as the user interface 10 of the HTML browser 30 installed in the information processing apparatus 100. The CPU 51 that executes the program is hardware.

The functions implemented by the display control program 70 may also be implemented by, for example, a semiconductor integrated circuit, more specifically, an application specific integrated circuit (ASIC) or the like.

Figure 12:
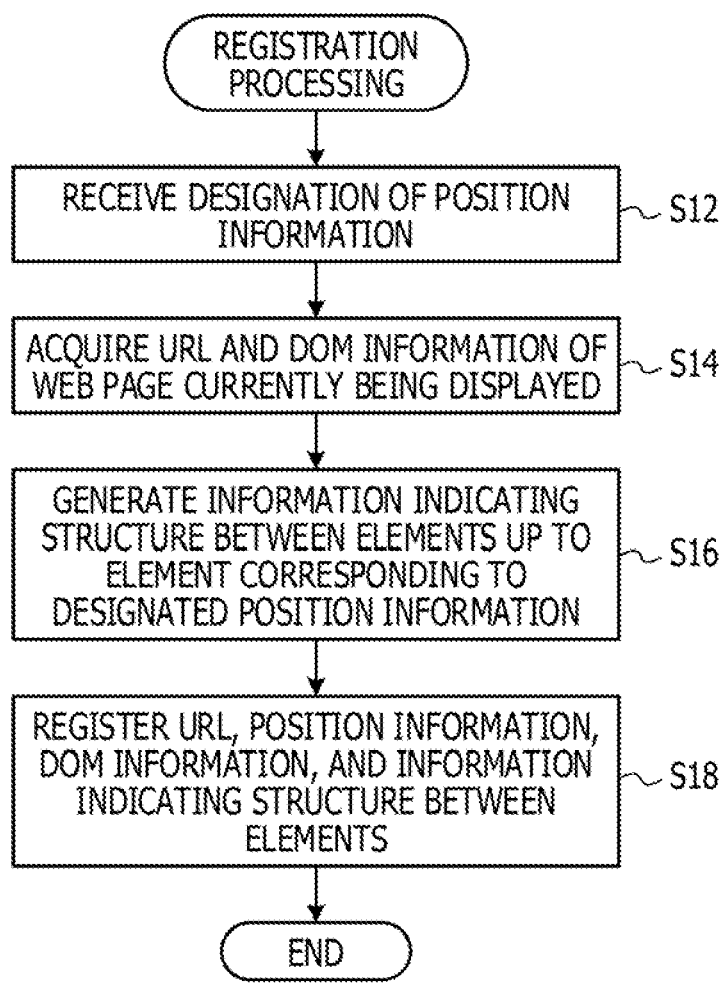
FIG. 12 is a flowchart illustrating an example of registration processing.
Figure 13:
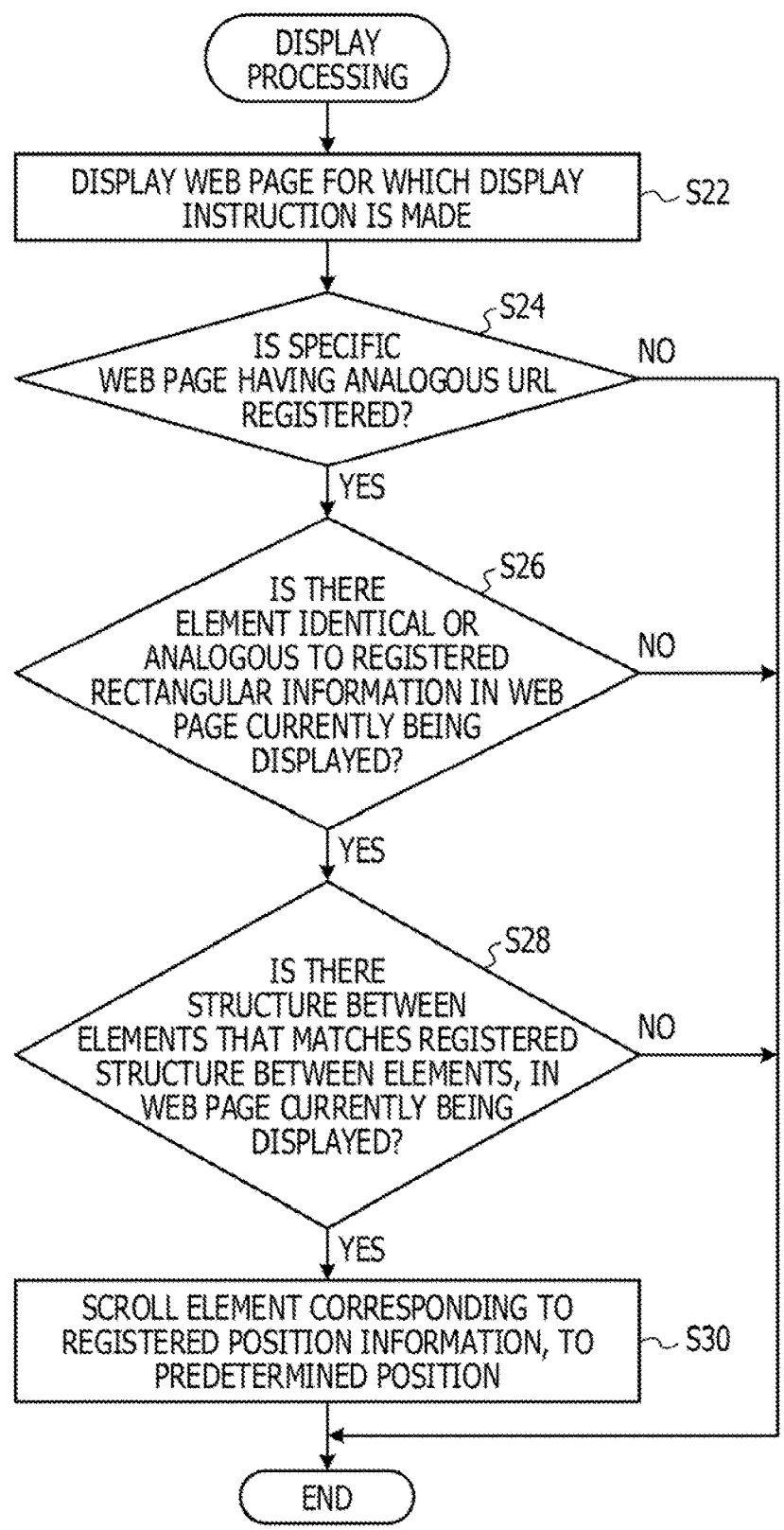
FIG. 13 is a flowchart illustrating an example of display processing.

Next, actions of the information processing apparatus 100 according to the embodiment will be described. When a menu for designating position information is selected by the pop-up menu 44 as illustrated in FIG. 6 or other commands during displaying a web page, the registration processing illustrated in FIG. 12 is executed in the information processing apparatus 100. Each time a display instruction of a web page is received, the display processing illustrated in FIG. 13 is executed in the information processing apparatus 100. The registration processing and the display processing are an example of the display control method of the disclosed technique. Each of the registration processing and the display processing will be described in details below.

First, the registration processing illustrated in FIG. 12 will be described. In step S12, the reception unit 12 receives the designation of the position information in the web page currently being displayed. For example, as illustrated in FIG. 6, the reception unit 12 acquires, from the DOM management unit 34, the rectangular information of the element in which the cursor 42 is located when the pop-up menu 44 for designating the position information is selected, and receives the rectangular information as the position information. The reception unit 12 transfers the received position information to the registration unit 14.

Next, in step S14, the registration unit 14 acquires the URL and DOM information of the web page currently being displayed from the DOM management unit 34.

Next, in step S16, the registration unit 14 identifies the tree structure of the web page being displayed from the DOM information acquired in step S12 described above. The registration unit 14 generates information (for example, Xpath) indicating the structure between the elements from the root of the identified tree structure to the element indicated by the position information transferred from the reception unit 12.

Next, in step S18, the registration unit 14 registers the position information transferred in step S12 described above, the URL and DOM information acquired in step S14 described above, and the information indicating the structure between the elements generated in step S18 described above, for example, in the registration information DB 20 as illustrated in FIG. 8. The registration processing ends.

Next, the display processing illustrated in FIG. 13 will be described. In step S22, the reception unit 12 receives the URL of the web page to be displayed as the display instruction of the web page, acquires the HTML source from the web server, and transfers it to the parser 32 or stores it in the predetermined storage area. The parser 32 converts the HTML source into DOM information and causes the DOM management unit 34 to hold the DOM information. The DOM management unit 34 visualizes the DOM information held by using the rasterizer 38, and displays the DOM information on the display unit 55 by using the GPU 54. The script engine 36 interprets a script written in JavaScript (registered trademark) and executes the script. As a result, the web page for which the display instruction has been made is displayed on the display unit 55.

Next, in step S24, the determination unit 16 determines whether or not each of the URLs registered in the registration information DB 20 and the URL of the web page currently being displayed are analogous to each other. The determination unit 16 determines whether or not the specific web page whose URL is analogous to the URL of the web page currently being displayed is registered in the registration information DB 20. When the specific web page having the analogous URL is registered, the processing moves to step S26, and when the specific web page having the analogous URL is not registered, the display processing ends.

In step S26, the determination unit 16 acquires the rectangular information registered as the "position information" associated with the URL of the specific web page determined to be analogous to the URL of the web page currently being displayed in the registration information DB 20. When there are a plurality of specific web pages having the URLs that are analogous to the URL of the web page currently being displayed, the web page having the highest URL matching degree may be selected as the specific web page.

The determination unit 16 inquires of the DOM management unit 34 whether or not the element indicating the rectangular information identical or analogous to the acquired rectangular information is included in the web page currently being displayed. When there is a response indicating that the corresponding element is included from the DOM management unit 34, the processing moves to step S28, and when there is a response indicating that the corresponding element is not included, the display processing ends.

Next, in step S28, the determination unit 16 acquires the "structure between the elements" of the specific web page from the registration information DB 20, and inquires of the DOM management unit 34 whether or not a structure between elements that matches the acquired structure between the elements is included in the web page currently being displayed. When there is a response indicating that the corresponding structure between the elements is included from the DOM management unit 34, the determination unit 16 transfers the rectangular information of the element included in the web page currently being displayed which is determined to be included in step S26 described above, to the display control unit 18, and the processing proceeds to step S30. On the other hand, when there is a response indicating that the corresponding structure between the elements is not included, the display processing ends.

In step S30, the display control unit 18 controls the display such that the web page currently being displayed is scrolled in order to arrange the element indicated by the rectangular information transferred from the determination unit 16, of the web page currently being displayed, at predetermined positions such as the head and the center of the browser. The display processing ends.

As described above, according to the information processing apparatus of the present embodiment, the user interface of the HTML browser installed in the information processing apparatus receives position information indicating a desired portion in the web page currently being displayed. The received position information is registered together with the information indicating the URL and the display configuration of the web page currently being displayed. When the web page is displayed, the display configurations of the web page whose position information is registered and the web page currently being displayed are compared with each other. When the display configurations of both web pages are analogous, the web page currently being displayed is scrolled such that the element of the web page currently being displayed corresponding to the registered position information is displayed at the predetermined position of the browser. Accordingly, when a web page is displayed, a region corresponding to a position designated by another web page may be automatically displayed.

As a method for displaying a portion desired by a user of a web page, the following methods may possibly be applied, but each method has a problem.

For example, it is also possible to apply an index (<a name=""> or the like of HTML) in advance at the web page side. However, in this case, it is time-consuming because a web page creator is required to provide the index every time. It is required for a user to find and click the index, so that it is also burdensome for the user.

For example, the index may possibly be provided at a search engine side, although it is effective for transition from a search result to the corresponding web page, it does not function for transition that is not via the search engine. Depending on the specification of the search engine, the index may not be provided.

For example, a bookmark is provided at a user side, but a function for providing a bookmark at the browser side is separately required, and it is effective only for the web page with the bookmark.

For example, coordinates designated by a user may possibly be stored, but when a template of the CMS is changed, the page may be scrolled to unintended coordinates.

In this embodiment, since the registered position information is used in the web page having the analogous display configuration, there is no problem which is assumed by each of the other methods as described above.

In the embodiment described above, the example in which the desired portion is arranged at the head of the browser is illustrated FIG. 10, but the position where the desired portion is arranged may be another position such as the center of the browser.

In the above embodiment, a case that inquires of the DOM management unit whether or not the registered structure between the elements is included in the web page currently being displayed has been described, but the disclosed technique is not limited thereto. For example, in the tree structure of the web page currently being displayed, the information indicating the structure between elements from the root to the element of the rectangular information identical or analogous to the registered rectangular information may be acquired from the DOM management unit. In this case, it is only required to compare the structure between the elements acquired from the DOM management unit, with the structure between the elements registered in the registration information DB 20, to determine whether or not the display configurations between the web pages are analogous.

In the display processing illustrated in FIG. 13 in the above embodiment, the processing order of step S26 and step S28 may be reversed. By combining step S26 and step S28, whether or not the display configuration of the web page currently being displayed is analogous to the display configuration of the specified web page may be determined. That is, for example, the similarity may be determined by mixing the rectangular information with the structure between the elements. For example, based on the structure between elements, the pieces of rectangular information of the elements that sequentially appear from the root may be compared, to determine whether or not the display configurations of the web pages are analogous, depending on whether or not the pieces of rectangular information are identical or analogous up to the corresponding element.

In the above embodiment, displaying a web page having an analogous display configuration to the registered web page is used as a trigger, the web page is automatically scrolled to the desired portion, but the disclosed technique is not limited thereto. For example, a button may be prepared on the browser in advance, and when the user presses the button, the web page may be scrolled such that the desired portion is arranged at a predetermined position.

In the embodiment described above, although an aspect of the embodiment has been described in which the display control program is stored (installed) in a storage unit in advance, the aspect is not limited thereto. The program according to the disclosed technique may be provided by using a form stored in a storage medium such as a compact disc read-only memory (CD-ROM), a digital versatile disc (DVD), a ROM, or a Universal Serial Bus (USB) memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-implemented display control method performed by a computer, the method comprising:
   in response to receiving an instruction for displaying a first web page, performing first processing including:
   obtaining, from a server, a first display configuration indicating contents of the first web page,
   obtaining, from a memory of the computer, a second display configuration indicating contents of a second web page different from the first web page, and
   obtaining a determination result by determining whether difference, between the first display configuration and the second display configuration satisfies a specific condition; and
   in response to the determination result indicating that the difference satisfies the specific condition, performing second processing including:
   obtaining, from the memory of the computer, position information associated with the second web page, the position information being information indicating a certain position at which a certain display item of the second web page is displayed on a display device of the computer, and
   displaying the first web page on the display device of the computer by using the obtained position information associated with the second web page to display a certain display item of the first web page at the certain position indicated by the obtained position information, each of the first web page and the second web page being larger in size than a screen of the display device, the position information including information on coordinates of a given element in the second web page, the displaying of the first web page being configured to shift, to a top position of the screen of the display device, a region of the first web page corresponding to the coordinates indicated by the position information to display the shifted first web page on the screen of the display device.

2. The display control method according to claim 1, wherein
   the displaying includes displaying the region of the first web page at a specific position on the screen of the display device.

3. The display control method according to claim 2, wherein
   the determining is performed based on first information related to the display configuration of the first web page and second information related to the display configuration of the second web page, the first information being acquired from a web server in response to the receiving of the instruction, the second information being stored in a memory.

4. The display control method according to claim 3, wherein
   the first information includes a first relationship between display elements included in the first web page,
   the second information includes a second relationship between display elements included in the second web page, and
   the determining is performed by comparing the first information with the second information.

5. The display control method according to claim 4, wherein
   the first relationship is represented by a first tree structure, and
   the second relationship is represented by a second tree structure.

6. The display control method according to claim 5, wherein
   the determining is performed based on whether a first structure from an element of a root to an element corresponding to the positional information in the first tree structure corresponds to a second structure from an element of a root to an element corresponding to the positional information in the second tree structure.

7. The display control method according to claim 1, wherein
   the determining is performed by comparing first information indicating arrangement of display elements of the first web page with second information indicating arrangement of display elements of the second web page.

8. The display control method according to claim 7, wherein
   the arrangement of display elements of the first web page includes rectangular information indicating at least one of a display position or a size of the display elements on the first web page as displayed on the screen of the display device.

9. The display control method according to claim 1, further comprising:
   receiving another positional information with respect to the displayed first web page, and
   storing the other positional information in the memory in association with the first web page.

10. The display control method according to claim 1, wherein
    the determining is performed based on first uniform resource locator of the first web page and second uniform resource locator of the second web page.

11. A display control apparatus comprising:
    a memory; and
    a processor coupled to the memory and the processor configured to perform processing, the processing including:
    in response to receiving an instruction for displaying a first web page, performing first processing including:
    obtaining, from a server, a first display configuration indicating contents of the first web page, obtaining, from a memory of the computer, a second display configuration indicating contents of a second web page different from the first web page, and obtaining a determination result by determining whether difference between the first display configuration and the second display configuration satisfies a specific condition; and in response to the determination result indicating that the difference satisfies the specific condition, performing second processing including:

obtaining, from the memory of the computer, position information associated with the second web page, the position information being information indicating a certain position at which a certain display item of the second web page is displayed on a display device of the computer; and displaying the first web page on the display device of the computer by using the obtained position information associated with the second web page to display a certain display item of the first web page at the certain position indicated by the obtained position information, each of the first web page and the second web page being larger in size than a screen of the display device, the position information including information on coordinates of a given element in the second web page, the displaying of the first web page being configured to shift, to a top position of the screen of the display device, a region of the first web page corresponding to the coordinates indicated by the position information to display the shifted first web page on the screen of the display device.

12. The display control apparatus according to claim 11, wherein
the displaying includes displaying the region of the first web page at a specific position on the screen of the display device.

13. The display control apparatus according to claim 12, wherein
the determination is performed based on first information related to the display configuration of the first web page and second information related to the display configuration of the second web page, the first information being acquired from a web server in response to the receiving of the instruction, the second information being stored in a memory.

14. The display control apparatus according to claim 13, wherein
the first information includes a first relationship between display elements included in the first web page,
the second information includes a second relationship between display elements included in the second web page, and
the determination is performed by comparing the first information with the second information.

15. The display control apparatus according to claim 14, wherein
the first relationship is represented by a first tree structure, and
the second relationship is represented by a second tree structure.

16. The display control apparatus according to claim 15, wherein
the determination is performed based on whether a first structure from an element of a root to an element corresponding to the positional information in the first tree structure corresponds to a second structure from an element of a root to an element corresponding to the positional information in the second tree structure.

17. The display control apparatus according to claim 11, wherein
the determination is performed by comparing first information indicating arrangement of display elements of the first web page with second information indicating arrangement of display elements of the second web page.

18. The display control apparatus according to claim 17, wherein
the arrangement of display elements of the first web page includes rectangular information indicating at least one of a display position or a size of the display elements on the first web page as displayed on the screen of the display device.

19. The display control apparatus according to claim 11, wherein the processor is further configured to:
receive another positional information with respect to the displayed first web page, and
store the other positional information in the memory in association with the first web page.

20. A non-transitory computer-readable medium storing a program for causing one or more computers to perform processing, the processing comprising:

in response to receiving an instruction for displaying a first web page, performing first processing including:
obtaining, from a server, a first display configuration indicating contents of the first web pace;
obtaining, from a memory of the computer, a second display configuration indicating contents of a second web page different from the first web page; and
obtaining a determination result by determining whether difference between the first display configuration and the second display configuration satisfies a specific condition; and in response to the determination result indicating that the difference satisfies the specific condition, performing second processing including:
obtaining, from the memory of the computer, position information associated with the second web page, the position information being information indicating a certain position at which a certain display item of the second web page is displayed on a display device of the computer; and
displaying the first web page on the display device of the computer by using the obtained position information associated with the second web page to display a certain display item of the first web page at the certain position indicated by the obtained position information, each of the first web page and the second web page being larger in size than a screen of the display device, the position information including information on coordinates of a given element in the second web page, the displaying of the first web page being configured to shift, to a top position of the screen of the display device, a region of the first web page corresponding to the coordinates indicated by the position information to display the shifted first web page on the screen of the display device.

* * * * *